(12) United States Patent
Shin et al.

(10) Patent No.: US 8,440,153 B2
(45) Date of Patent: May 14, 2013

(54) METHOD FOR PREPARING MANGANESE SULFATE AND ZINC SULFATE FROM WASTE BATTERIES CONTAINING MANGANESE AND ZINC

(75) Inventors: Shun Myung Shin, Daejeon (KR); Jin Gu Kang, Daejeon (KR); Jeong Soo Sohn, Daejeon (KR); Hyun Gun Kim, Gwangju (KR); Moon Ho Kim, Gwangju (KR)

(73) Assignees: Korea Institute of Geoscience and Mineral, Daejeon (KR); Econics Corporation, Jeollabuk-Dö (KR)

( * ) Notice: Subject to any disclaimer, the term of this patent is extended or adjusted under 35 U.S.C. 154(b) by 523 days.

(21) Appl. No.: 12/692,663

(22) Filed: Jan. 25, 2010

(65) Prior Publication Data

US 2011/0123419 A1    May 26, 2011

(30) Foreign Application Priority Data

Nov. 20, 2009  (KR) ........................ 10-2009-0112705

(51) Int. Cl.
  *C22B 47/00*    (2006.01)
(52) U.S. Cl.
  USPC .......................................................... 423/49
(58) Field of Classification Search .................... None
  See application file for complete search history.

(56) References Cited

FOREIGN PATENT DOCUMENTS

| KR | 1020000040927 | * | 7/2000 |
| KR | 102000053422 | * | 3/2002 |
| KR | 10-0656891 B1 | | 12/2006 |
| KR | 10-0706268 B1 | | 4/2007 |
| KR | 10-0709268 B1 | | 4/2007 |

OTHER PUBLICATIONS

Park, K., et al., "Sulfuric Acid Leaching of Valuable Metals from Spent Petrochemical Catalyst using Hydrogen Peroxide as a Reducing Agent", "J. of Korean Inst. of Resources Recycling", 2001, pp. 2026, vol. 10, No. 2 (English Abstract).

* cited by examiner

*Primary Examiner* — Milton I Cano
*Assistant Examiner* — Sarah A Slifka
(74) *Attorney, Agent, or Firm* — Hulquist, PLLC; Steven J. Hultquist

(57) ABSTRACT

A method for preparing manganese sulfate and zinc sulfate from waste batteries containing manganese and zinc, and more particularly to a method for preparing manganese sulfate and zinc sulfate from waste batteries containing manganese and zinc. Zinc powder and activated carbon are added to a leached solution obtained from a continuous leaching process so as to remove heavy metals and organic materials from the leached solution, and then the leached solution is spray-dried to simultaneously obtain manganese sulfate and zinc sulfate at high-purity by a simple process without generating wastewater. An environmentally friendly waste battery recycling process is thereby provided, because it is not required to use additional chemical substances for neutralization titration or impurity removal in recovering manganese sulfate and zinc sulfate by leaching a waste battery powder.

9 Claims, 1 Drawing Sheet

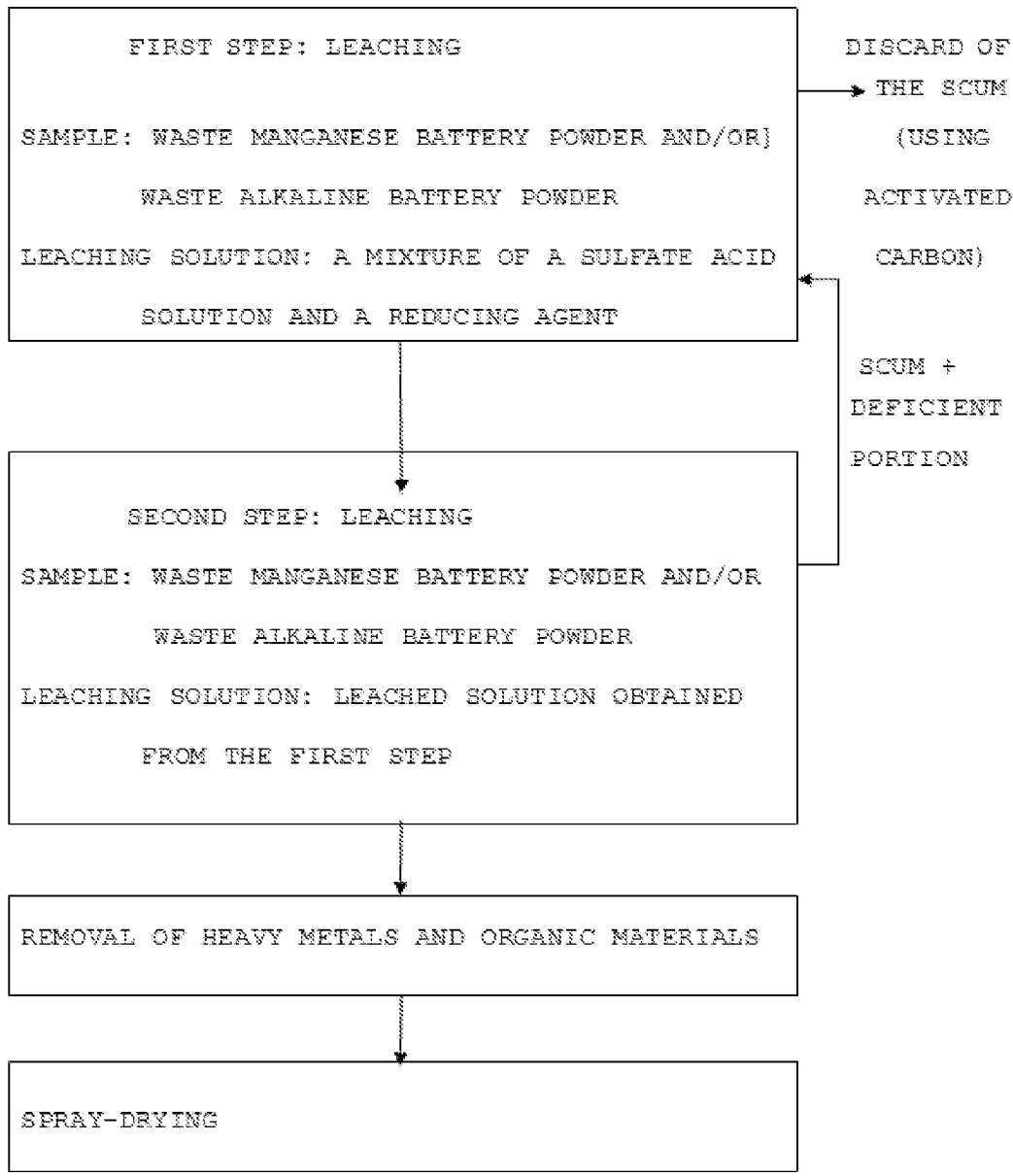

METHOD FOR PREPARING MANGANESE SULFATE AND ZINC SULFATE FROM WASTE BATTERIES CONTAINING MANGANESE AND ZINC

CROSS-REFERENCE TO RELATED APPLICATIONS

This application claims the priority under 35 USC 119 of Korean Patent Application No. 10-2009-0112705, filed on Nov. 20, 2009 in the Korean Intellectual Property Office, the disclosure of which is incorporated herein by reference in its entirety.

BACKGROUND OF THE INVENTION

1. Field of the Invention

The present invention relates to a method for preparing manganese sulfate and zinc sulfate from waste batteries containing manganese and zinc, and more particularly to such a method for preparing manganese sulfate and zinc sulfate from waste batteries containing manganese and zinc, the method comprising adding zinc powder and activated carbon to a leached solution obtained from a continuous leaching process so as to remove heavy metals (nickel and cadmium) and organic materials from the leached solution, and then spray-drying the leached solution to simultaneously obtain manganese sulfate and zinc sulfate.

2. Background of the Related Art

Manganese batteries and alkaline manganese batteries have been excluded from burden charge-imposed items and have been treated as general wastes while having come into the market since 1996. However, since these batteries contain metal components such as manganese, zinc, iron and the like and an electrolyte such as KOH and the like, they give a load to the surrounding environment upon the reclamation or incineration thereof. Therefore, the developed countries such as the European Unit (EU), etc., have an obligation to collect and recycle all the waste batteries including primary batteries.

Recently, in the situation where the costs of mineral resources and metals rise due to a serious disturbance in the raw material market, in the case where batteries employing high-purity metals and metal compounds are recycled, the recycling of waste batteries is indispensable, but not optional for Korea depending upon the import of all of its metal minerals in terms of storage of the raw materials.

In Korea, currently, manganese batteries and alkaline manganese batteries are treated as general wastes. Since constituent components of the batteries are mostly low-priced metals, no battery manufacturer positively recycles waste manganese batteries.

Even in foreign countries, the recycling of the manganese batteries and the alkaline manganese batteries is recognized in terms of resolution of environmental problems rather than recovery of priced metals. The manganese batteries and the alkaline manganese batteries are generally treated by using a dry treatment method in which they are supplied as raw materials in a ferromanganese preparing process. But such a dry treatment method entails a problem in that the price of the prepared products including collection and conveyance costs is relatively low as compared to treatment costs, leading to a decrease in economic efficiency.

In order to address and resolve the above problem, a research is in progress on the development of a waste battery recycling process with economic efficiency. Since the waste batteries are not generated in a large amount, the research progresses toward wet treatment or high value addition of the waste batteries.

As a technique of covering and recycling priced metals from waste batteries, Korean Patent Registration No. 656,891 discloses a method for preparing a manganese (Mn)-zinc (Zn) ferrite powder from waste manganese batteries, which includes a three time leaching process consisting of alkaline leaching, acid leaching and coprecipitation for the purpose of recovery of zinc. However, the above method implies a drawback in that it requires complicated processes such as separate injection of manganese, zinc and iron so as to obtain the Mn—Zn ferrite powder, addition of an alkaline leaching solution used in recovery of zinc for the adjustment of the pH, etc.

SUMMARY OF THE INVENTION

Accordingly, the present inventors have made many efforts to develop a manganese and zinc collecting method which simplifies the process and has economic efficiency, and as a result, have found that a method could be developed for preparing manganese sulfate and zinc sulfate from waste batteries containing manganese and zinc, the method including repeatedly leaching a waste battery powder having a particle size of less than 8 mesh to obtain a neutralized leached solution, adding zinc powder and activated carbon to the leached solution so as to remove heavy metals and organic materials from the leached solution, then spray-drying the leached solution, so that an environmentally friendly and economically efficient process for recycling waste batteries can be provided by eliminating the necessity of using additional chemical substances for removal of impurities contained in the waste battery powder, thereby completing the present invention.

It is an object of the present invention to provide a method for preparing manganese sulfate and zinc sulfate from waste batteries containing manganese and zinc.

To achieve the above objects, the present invention provides a method for preparing manganese sulfate and zinc sulfate from waste batteries containing manganese and zinc, the method including the steps of: (a) leaching a first waste battery powder with a mixture of a sulfuric acid solution and a reducing agent; (b) leaching a second waste battery powder with the leached solution obtained from the step (a); (c) removing heavy metals and organic materials from the leached solution obtained from the step (b); and (d) spray-drying the leached solution obtained from the step (c), thus preparing manganese sulfate and zinc sulfate.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 1 is a process chart illustrating a process for preparing manganese sulfate and zinc sulfate from waste batteries containing manganese and zinc according to the present invention.

DETAILED DESCRIPTION OF THE PREFERRED EMBODIMENT

Hereinafter, the present invention will be described in detail.

In one aspect, the present invention is directed to a method for preparing manganese sulfate and zinc sulfate from waste batteries containing manganese and zinc, the method including the steps of: (a) leaching a first waste battery powder with a mixture of a sulfuric acid solution and a reducing agent; (b) leaching a second waste battery powder with the leached solution obtained from the step (a); (c) removing heavy metals and organic materials from the leached solution obtained from the step (b); and (d) spray-drying the leached solution obtained from the step (c), thus preparing manganese sulfate and zinc sulfate (see FIG. 1).

The term "continuous leaching" as used herein refers to the continuous performance of a process of leaching a waste battery powder, and preferably may be a two time-continuous performance of the leaching process.

The terms "first waste battery powder" and "second waste battery powder" as used herein refer to a waste battery powder containing a similar ingredient which may be obtained through the same process. Herein, in order to distinguish between a waste battery powder used in a first leaching step and a waste battery powder used in a second leaching step, respectively, the waste battery powder is divided into a first waste battery powder and a second waste battery powder.

The present invention is characterized in that a two time leaching process is performed by using a waste battery powder containing manganese and zinc as a sample. In this case, a sample and a leaching solution used in a first leaching step are a first waste battery powder and a mixture of a sulfuric acid solution and a reducing agent, respectively. A sample and a leaching solution used in a second leaching step are a first waste battery powder and a leached solution obtained after the first leaching process.

In the present invention, the waste batteries containing manganese and zinc are waste manganese batteries or waste alkaline manganese batteries, and further include an impurity selected from the group consisting of Fe, Cu, Al, Ni, Cd, Pb and a mixture thereof.

In the present invention, the first and second waste battery powder has a particle size in the range between 0 mesh and 8 mesh (0 mesh<particle size<8 mesh) suited to the leaching process. A waste manganese battery powder or a waste alkaline manganese battery powder having a particle size in the range between 0 mesh and 8 mesh (0 mesh<particle size<8 mesh) can be obtained by a continuous process including separation, crushing, magnetic separation and size separation according to a physical treatment process of an apparatus and method for recycling waste manganese batteries and waste alkaline batteries, which is disclosed in Korean Patent Registration No. 706,268. In this case, the use of waste battery powder having a particle size in the range between 0 mesh and 8 mesh (0 mesh<particle size<8 mesh) can increase a concentration rate of Mn and Zn in a crushed product of the waste battery and can decrease the content of impurities such as vinyl, plastic, carbon rods and the like.

In a mixture of a sulfuric acid solution and a reducing agent used as a leaching solution in the first leaching step, if the sulfuric acid solution is used in an amount of less than 0.5M, the leaching effect of manganese and zinc is small. On the contrary, if the sulfuric acid solution is used in an amount of more than 1M, there is no benefit according to an increase in the amount of the sulfuric acid solution used. Thus, it is preferably to use the sulfuric acid solution in an amount between 0.5M and 1M. In addition, if the reducing agent is used in an amount of less than 1 wt % on a weight basis, the leaching effect of manganese and zinc is small. On the contrary, if the reducing agent is used in an amount of more than 3 wt % on a weight basis, there is no benefit according to an increase in the amount of the reducing agent used. Thus, it is preferably to use the sulfuric acid solution in an amount between 1 wt % and 3 wt % on a weight basis.

In the present invention, the leaching solution used in the first leaching step comprises 1 to 3.2 parts by weight of the reducing agent of 0.05M to 0.15M based on 100 parts by weight of the sulfuric acid solution of 0.5M to 1M. In this case, if the content of the reducing agent is less than 1 parts by weight based on 100 parts by weight of the sulfuric acid solution, the leaching effect of manganese and zinc is small. On the contrary, the content of the reducing agent exceeds 3.2 parts by weight based on 100 parts by weight of the sulfuric acid solution, the amount of manganese and zinc leached is no longer increased.

In the present invention, the reducing agent is selected from the group consisting of hydrogen peroxide, hydrogen sulfide ($H_2S$), sulfur dioxide ($SO_2$), iron sulfate ($FeSO_4$), coal and pyrite.

Previous research has reported that addition of a reducing agent has an effect on an increase in the leaching rate of manganese oxide upon the acid leaching of the manganese oxide which is chemically stable in an acid atmosphere (K.-H. Park et al., *J. Korean Inst. Resources Recycling*, 10(2):20-26, 2001). Accordingly, in the present invention, the recovery rate of manganese from waste manganese batteries and/or waste alkaline batteries can be improved by the application of the concentration, the use amount, and the reaction temperature and time of the reducing agent which can optimize the leaching rate of the manganese oxide.

In the present invention, the first leaching step is performed for 30-120 minutes between room temperature and 80° C. When the first leaching step is performed between room temperature and 80° C., the leaching rate of manganese and zinc can be increased so as to improve the preparing efficiency of manganese sulfate and zinc sulfate. When the leaching time in the first leaching step is 30-120 minutes, the leaching rate of manganese and zinc can also be increased so as to improve the preparing efficiency of manganese sulfate and zinc sulfate. On the contrary, if the leaching time exceeds 120 minutes, there is no change in the leaching rate according to an increase in time. In this case, the scum produced after the first leaching step is discarded and disposed.

In the present invention, in the first leaching step, the first waste battery powder is leached in an amount of 10 to 60 parts by weight based on 100 parts by weight of the mixture of a sulfuric acid solution and a reducing agent. In this case, the leaching rate of the first waste battery powder can be optimized.

In the present invention, the second leaching step is performed for 30-120 minutes between room temperature and 80° C. When the second leaching step is performed between room temperature and 80° C., the leaching rate of manganese and zinc can be increased so as to improve the preparing efficiency of manganese sulfate and zinc sulfate. When the leaching time in the second leaching step is 30-120 minutes, the leaching rate of manganese and zinc can also be increased so as to improve the preparing efficiency of manganese sulfate and zinc sulfate. On the contrary, if the leaching time exceeds 120 minutes, there is no change in the leaching rate according to an increase in time.

In the present invention, in the second leaching step, the second waste battery powder is leached in an amount of 10-60 parts by weight based on 100 parts by weight of the leached solution obtained from the first leaching step. In this case, the leaching rate of the second waste battery powder can be optimized.

The leached solution obtained after a continuous leaching process consisting of the first and second leaching steps has a pH value of 4 to 6.5. The leached solution is neutralized even without a separate neutralization titration process so as to remove copper, aluminum, iron, lead and the like along with the continuous leaching process. After the continuous leaching process, since the concentration of hydrogen ions ($H^+$) in the leached solution is reduced to $[H^+]=10^{-6}$ to cause impurities present in an ion phase to be precipitated into a solid phase, the resultantly-obtained leached solution has a pH value of 4 to 6.5.

In the present invention, in the step (c) of removing the heavy metals and the organic materials, it is preferably to sequentially remove heavy metals and organic materials remaining in the leached solution after the continuous leaching process.

After the continuous leaching process consisting of the first and second leaching steps, heavy metals such as cadmium, nickel and the like which have not been removed completely even by neutralization are removed by being substituted with zinc powder. That is, the heavy metals are removed by adding zinc powder to the leached solution obtained from the second leaching step. In this case, preferably, the zinc powder is added in an amount of 1 to 10 parts by weight to the leached solution obtained from the second leaching step based on 100 parts by weight of the leached solution so as to substitute the heavy metals with zinc powder to thereby remove the heavy metals.

Thereafter, activated carbon is added to the leached solution from which the heavy metals have been removed so as to remove the organic materials from the leached solution. In this case, preferably, the activated carbon is added in an amount of 1 to 10 parts by weight to the leached solution based on 100 parts by weight of the leached solution, followed by filtration to thereby remove the organic materials from the leached solution.

When the leached solution from which the organic materials has been removed is spray-dried, manganese sulfate and zinc sulfate can be prepared. In this case, the manganese sulfate and the zinc sulfate are present in the form of mixed minerals.

In the present invention, the spray-drying step can be performed by using a spray-drier having an inlet temperature of 180-350° C. and an outlet temperature of 90-150° C. Under the above condition of the spray-drier, the preparing efficiency of the manganese sulfate and the zinc sulfate can be maximized.

In addition, the present invention further comprises leaching the waste battery powder using the leached solution obtained from the second leaching step. In this case, the waste battery powder used is a waste battery powder of the same type and having the same component as those of the first waste battery powder and the second waste battery powder used in the first and second leaching steps, respectively, but means a new waste battery powder which has been not used in the first and second leaching steps. That is, in the present invention, a tree time-leaching process as well as the two time-leaching process may be performed in order to prepare manganese sulfate and zinc sulfate from waste batteries containing manganese and zinc. Also, a more than four time leaching process may be performed. In addition, the scum produced after the second leaching step is re-used as a sample. In this case, since a deficient portion relative to the amount of the first leaching sample is included in the scum which is in turn re-used, the production of the waste scum is minimized.

The present invention is directed to a method for recovering manganese sulfate and zinc sulfate from waste batteries, the method including a continuous leaching process. Since neutralization of the resultant leached solution or impurity removal are performed simultaneously during the continuous leaching process, the process can be minimized. Accordingly, since additional chemical substances need not to be used to prepare high-purity manganese sulfate and zinc sulfate, it is expected to provide an environmentally friendly process for recycling waste batteries.

EXAMPLE

Hereinafter, the present invention will be described in further detail with reference to examples. It will be obvious to those skilled in the art that these examples are illustrative purposes only and are not to be construed to limit the scope of the present invention.

Example 1

Preparation of Waste Manganese Battery Powder

According to a physical treatment device and a physical treatment flow chart of waste manganese batteries and waste alkaline batteries shown in FIGS. 1a and 2 of Korean Patent Registration No. 709,268 entitled "APPARATUS AND METHOD FOR RECYCLING WASTE MANGANESE BATTERIES AND WASTE ALKALINE BATTERIES", a waste battery powder having a particle size in the range between 0 mesh and 8 mesh (0 mesh<particle size<8 mesh) was prepared. In this case, the content of manganese (Mn) contained in the waste battery powder was 26-29 wt % and the content of zinc (Zn) contained in the waste battery powder was 20-22 wt %.

Example 2

Preparation of Manganese Sulfate and Zinc Sulfate from Waste Manganese Batteries 2-1. First Leaching Step Using a Mixture of a Sulfuric Acid Aqueous Solution and a Reducing Agent A mixture of 4.7 L of a sulfuric acid aqueous solution of 1M and 0.3 L of hydrogen peroxide of 0.15M is was as a leaching solution, and 500 g of the waste manganese battery powder prepared in Example 1 was leached using the leaching solution. In this case, the waste manganese battery powder was leached for one hour under the leaching condition including a temperature of 60° C., a stifling rate of 250 rpm, and then the components of the leaching solution was analyzed with ICP-AES (Jobin Yvon, model JY38plus, France).

As a result, as shown in Table 1, the leaching rates of Zn and Mn were 95.3% and 86.8%, respectively. Impurities such as Fe, Cu, Ni, Al, Cd and Pb were still remained in a large amount in the leached solution.

TABLE 1

Analysis result of components of the leached solution obtained from a first leaching step (mg/L)

|  | Zn | Mn | Fe | Cu | Ni | Al | Cd | Pb | pH |
|---|---|---|---|---|---|---|---|---|---|
| Leached Solution obtained from First Leaching Step | 23200 | 23400 | 1800 | 12 | 14 | 240 | 35 | 13 | 0.97 |
| Leaching Rate (%) | 95.3 | 86.8 | 5.5 | 34.9 | 47.0 | 11.3 | 95.4 | 93.1 | |

2-2. Second Leaching Step Using the Leached Solution Obtained from the First Leaching Step 500 Ml of a mixture of 470 ml of a leached solution obtained from the first leaching step 2-1 and 30 Ml of hydrogen peroxide was used as a leaching solution, and 50 g of the waste manganese battery powder prepared in Example 1 was leached. In this case, the waste manganese battery powder was leached for two hour under the leaching condition including a change in the temperature of 40° C., 60° C. and 80° C. and a stirring rate of 250 rpm, and then the components of the leached solution and the content of priced metals contained in the scum of the leached solution were analyzed, respectively, with ICP-AES (Jobin Yvon, model JY38plus, France) to thereby calculate the leaching rate.

As a result, as shown in Table 2, it could be found that as the leaching temperature increases, the concentration of Zn contained in the leached solution also increases. Also, it could be found from Table 2 that Mn is somewhat high in concentration, but exhibits relatively similar concentrations irrespective of the change in the temperature. It was found that Fe, Cu, Al and Pb except Ni and Cd were nearly removed.

TABLE 2

Analysis result of components of the leached solution obtained from a second leaching step (mg/L)

| Composition of Leached Solution obtained from Second Leaching Step | Zn | Mn | Fe | Cu | Ni | Al | Cd | Pb | pH |
|---|---|---|---|---|---|---|---|---|---|
| 40° C. | 31100 | 31400 | 1 | 1 | 16 | 0.42 | 11.9 | 1 | 5.59 |
| 60° C. | 32000 | 29400 | 3.2 | 0.66 | 15 | 0.57 | 9.7 | 0.7 | 5.26 |
| 80° C. | 35500 | 29200 | 0.8 | 0.56 | 16 | 0.32 | 9.1 | 0.56 | 5.47 |

2-3. Removal of Heavy Metals by Addition Zinc Powder

Zinc powder was added in an amount of 5 parts by weight to the leached solution obtained from the second leaching step at a temperature of 60° C., based on 100 parts by weight of the leached solution obtained from the second leaching step 2-2.

As a result, as shown in Table 3, it could be found that Ni and Cd remaining in a large amount in the leached solution after the second leaching step were removed by being substituted with zinc powder.

TABLE 3

|  | Zn | Mn | Fe | Cu | Ni | Al | Cd | Pb | pH |
|---|---|---|---|---|---|---|---|---|---|
| Composition of Leached Solution obtained from Second Leaching Step at 60° C. (before substitution by zinc powder) | 32000 | 29400 | 3.2 | 0.66 | 15 | 0.57 | 9.7 | 0.7 | 5.26 |
| After substitution by zinc powder | 33000 | 28100 | 0 | 0 | 7 | 0.1 | 0 | 0 | |

2-4. Removal of Organic Materials by Addition of Activated Carbon

Activated carbon was added in an amount of 5 parts by weight to the leached solution from which the heavy metals have been removed in the heavy metal removal step 2-4 based on 100 parts by weight of the leached solution, followed by filtration.

2-5. Vacuum Distillation

The resultant leached solution obtained from the organic material removal step 2-4 was spray-dried in a spray-drier having an inlet temperature of 250° C. and an outlet temperature of 120° C., thus simultaneously preparing 93.165 g of manganese sulfate 1-hydrate and 109.87 g of zinc sulfate 1-hydrate.

As described above, According to the present invention, high-purity manganese sulfate and zinc sulfate can be prepared by a simple process without generating wastewater. In addition, the present invention can provide an environmentally friendly process for recycling waste batteries, because it is not required to use additional chemical substances for neutralization titration or impurity removal in a process of recovering manganese sulfate and zinc sulfate by leaching a waste battery powder.

While the present invention has been described in detail with reference to specific features, it will be apparent to those skilled in the art that this description is only for a preferred embodiment and does not limit the scope of the present invention. Thus, the substantial scope of the present invention will be defined by the appended claims and equivalents thereof.

What is claimed is:

1. A method for preparing manganese sulfate and zinc sulfate from waste batteries containing manganese and zinc, the method comprising the steps of:
   (a) leaching a first waste battery powder with a mixture of a sulfuric acid solution and a reducing agent, wherein the first waste battery powder is in an amount of from 10 to 60 parts by weight, based on 100 parts by weight of the mixture of the sulfuric acid solution and the reducing agent, to form a leached solution;
   (b) leaching a second waste battery powder with the leached solution obtained from the step (a), wherein the second waste battery powder is in an amount of from 10 to 60 parts by weight, based on 100 parts by weight of the leached solution obtained from the step (a), to form a leached solution;
   (c) removing heavy metals and organic materials from the leached solution obtained from the step (b), to form a leached solution; and
   (d) spray-drying the leached solution obtained from the step (c), thus preparing manganese sulfate and zinc sulfate.

2. The method according to claim 1, wherein the waste batteries containing manganese and zinc are waste manganese batteries or waste alkaline manganese batteries.

3. The method according to claim 1, wherein the reducing agent is selected from the group consisting of hydrogen peroxide, hydrogen sulfide ($H_2S$), sulfur dioxide ($SO_2$), iron sulfate ($FeSO_4$), coal and pyrite.

4. The method according to claim 1, wherein the leached solution obtained from the step (b) has a pH value of 4 to 6.5.

5. The method according to claim 1, wherein in the step (c), the heavy metals are removed, and then the organic materials are removed.

6. The method according to claim 1, wherein in the step (c), the heavy metals are removed by adding zinc powder to the leached solution obtained from the step (b).

7. The method according to claim 1, wherein in the step (c), the organic materials are removed by adding activated carbon to the leached solution after the heavy metals have been removed.

8. The method according to claim 6, wherein in the step (c), the zinc powder is added in an amount of from 1 to 10 parts by weight, based on 100 parts by weight of the leached solution obtained from the step (b).

9. The method according to claim 7, wherein in the step (c), the activated carbon is added to the leached solution after the heavy metals have been removed, in an amount of from 1 to 10 parts by weight of activated carbon, based on 100 parts by weight of the leached solution after the heavy metals have been removed.

* * * * *